United States Patent
Lee

(10) Patent No.: US 12,024,377 B2
(45) Date of Patent: Jul. 2, 2024

(54) METHOD AND APPARATUS FOR PROVIDING AUTOMATIC SHIPPING BY USING AUTONOMOUS DRIVING VEHICLE

(71) Applicant: LKSYS INC., Seoul (KR)

(72) Inventor: Hui Won Lee, Seoul (KR)

(73) Assignees: Hui Won Lee (KR); LYSYS INC. (KR)

(*) Notice: Subject to any disclaimer, the term of this patent is extended or adjusted under 35 U.S.C. 154(b) by 0 days.

(21) Appl. No.: 17/434,732

(22) PCT Filed: Apr. 10, 2019

(86) PCT No.: PCT/KR2019/004303
§ 371 (c)(1),
(2) Date: Feb. 22, 2022

(87) PCT Pub. No.: WO2020/209402
PCT Pub. Date: Oct. 15, 2020

(65) Prior Publication Data
US 2022/0234845 A1    Jul. 28, 2022

(51) Int. Cl.
| | |
|---|---|
| B65G 67/60 | (2006.01) |
| B60W 30/18 | (2012.01) |
| B60W 60/00 | (2020.01) |
| G01C 21/36 | (2006.01) |
| G06Q 10/0831 | (2023.01) |
| B60P 3/06 | (2006.01) |

(52) U.S. Cl.
CPC ....... B65G 67/60 (2013.01); B60W 30/18163 (2013.01); B60W 60/00256 (2020.02);
(Continued)

(58) Field of Classification Search
CPC ............ B65G 67/60; B60W 60/00256; B60W 30/18163; B60W 2556/40;
(Continued)

(56) References Cited

U.S. PATENT DOCUMENTS

| | | |
|---|---|---|
| 10,146,226 B1 | 12/2018 | Salter et al. |
| 2008/0158340 A1 | 7/2008 | Shibata et al. |

(Continued)

FOREIGN PATENT DOCUMENTS

| | | |
|---|---|---|
| JP | 2004123257 A | 4/2004 |
| JP | 2015225541 A | 12/2015 |

(Continued)

OTHER PUBLICATIONS

Kanai (Year: 2014).*
(Continued)

*Primary Examiner* — Aryan E Weisenfeld
(74) *Attorney, Agent, or Firm* — Renaissance IP Law Group LLP

(57) ABSTRACT

An automatic shipping method and apparatus using an autonomous driving vehicle are disclosure. An embodiment of the disclosure provides a method and apparatus for providing automatic shipping by using an autonomous driving vehicle, which are applied to the technical field of moving a vehicle first to a vehicle loading dock and then to a loading location on a ship, and fixing the vehicle to the ship, so that a vehicle is automatically loaded onto a ship by autonomous driving of the vehicle based on the map of a loading dock and the ship, and destination information.

12 Claims, 4 Drawing Sheets

(52) U.S. Cl.
CPC ..... *G01C 21/3691* (2013.01); *G06Q 10/0831* (2013.01); *B60P 3/06* (2013.01); *B60W 2420/403* (2013.01); *B60W 2520/10* (2013.01); *B60W 2554/4042* (2020.02); *B60W 2554/802* (2020.02); *B60W 2555/60* (2020.02); *B60W 2556/40* (2020.02)

(58) Field of Classification Search
CPC ..... B60W 2554/4042; B60W 2555/60; B60W 2554/802; B60W 2420/42; B60W 2520/10; G01C 21/3691; G06Q 10/0831; B60P 3/06
See application file for complete search history.

(56) References Cited

U.S. PATENT DOCUMENTS

| | | |
|---|---|---|
| 2016/0171894 A1 | 6/2016 | Harvey |
| 2017/0329346 A1 | 11/2017 | Latotzki |
| 2019/0064809 A1 | 2/2019 | Salter et al. |

FOREIGN PATENT DOCUMENTS

| | | |
|---|---|---|
| JP | 2019046013 A | 3/2019 |
| KR | 20150082867 A | 7/2015 |
| KR | 20170081846 A | 7/2017 |
| KR | 20190067430 A | 6/2019 |
| WO | 2015166811 A1 | 11/2015 |
| WO | 2019005976 A1 | 1/2019 |

OTHER PUBLICATIONS

Hwang (Year: 2014).*
Mico (Year: 2015).*
European Extended Search Report for Application No. 19924580.4, mailed Nov. 9, 2022.
Hamalainen, Jari et al., "Automated container terminals and self-driving cars: Industry outlook", Kalmar 2018.

* cited by examiner

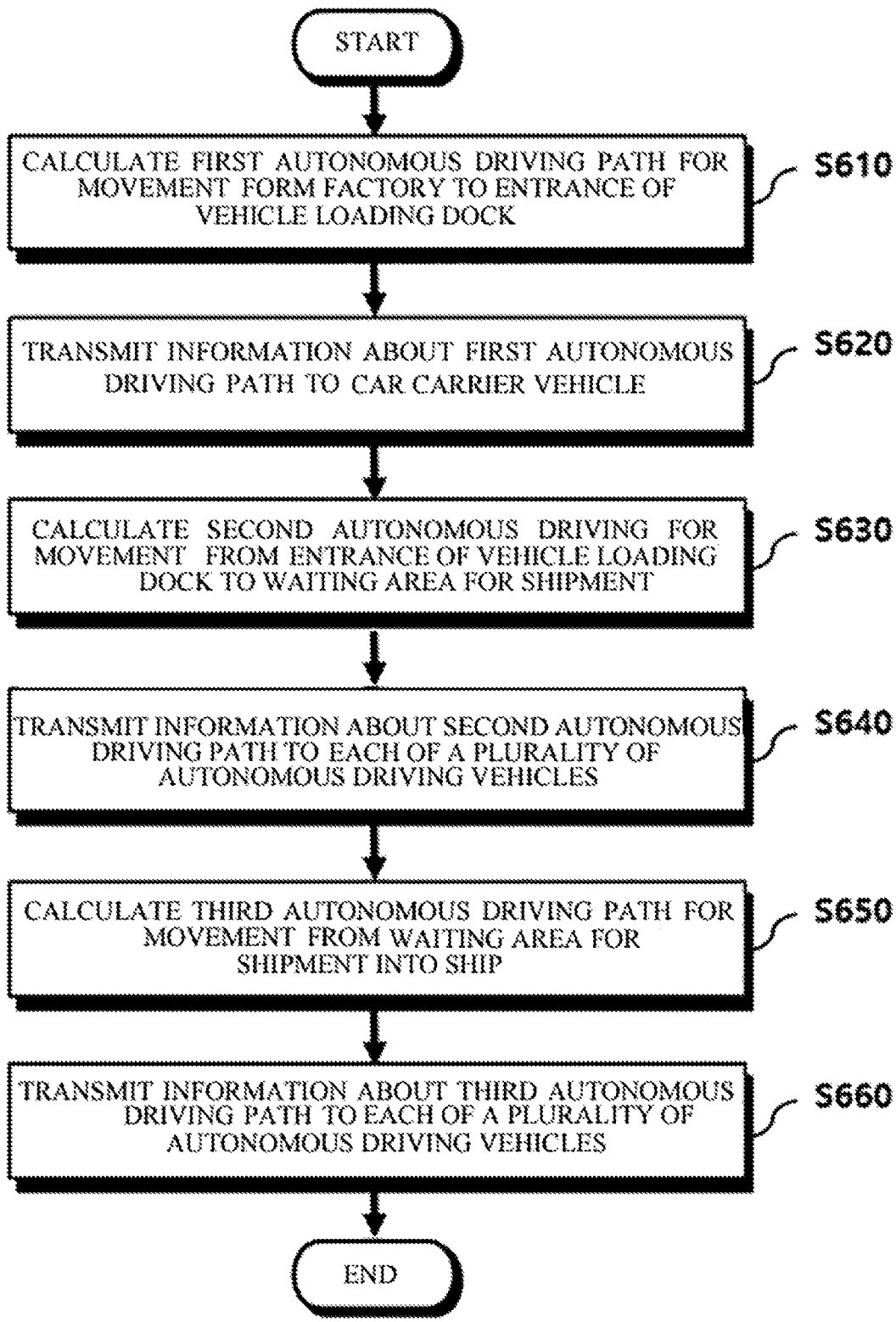

METHOD AND APPARATUS FOR PROVIDING AUTOMATIC SHIPPING BY USING AUTONOMOUS DRIVING VEHICLE

TECHNICAL FIELD

The disclosure relates to a method and apparatus for providing automatic shipping by an autonomous driving vehicle.

BACKGROUND ART

The following information is presented as background information only to assist with an understanding of the present disclosure. No determination has been made, and no assertion is made, as to whether any of the above might be applicable as prior art with regard to the present disclosure.

An autonomous driving system is a system capable of automatically driving to a predetermined destination without a driver's intervention by recognizing the surroundings and a vehicle condition. The autonomous driving system operates in the steps of recognition, determination, route generation, and vehicle control. In the route generation step, an avoidance path is generated in real time by identifying a change in an obstacle, and a route is generated by reflecting the kinematic behavior of the vehicle.

Particularly in the route generation step, a stable driving path should be generated in consideration of collision with adjacent dynamic obstacles because various dangerous situations may occur when the autonomous driving vehicle attempts to change lanes in an urban area, a congested section, and a highway that are changed in real time. Therefore, research has been continuously conducted on generation of a driving path that enables an autonomous driving vehicle to change lanes stably.

In general, the autonomous driving vehicle recognizes lanes at both sides of a driving lane and travels in the middle of the recognized lanes. The autonomous driving vehicle generates candidate paths within lanes in consideration of adjacent vehicles or obstacles, and travels biased from the center of the driving lane by selecting a local path within the lane (the boundaries of the driving lane) to avoid collision with an obstacle and ensure safety.

In general, to take out a vehicle from a factory and then load the vehicle onto a ship, human driving is involved in primary movement of a car carrier vehicle loaded with the vehicle to a vehicle loading dock, secondary movement of the vehicle from the car carrier vehicle to a waiting place for shipment, and third movement of the vehicle from the waiting place for shipment to the ship.

In the above-described shipping procedure, human driving is involved in every process, and cost is expended each time the vehicle is loaded and unloaded. Therefore, there is a need for a technique for automatic shipping by using an autonomous driving vehicle.

DISCLOSURE

Technical Problem

Provided are a method and apparatus for providing automatic shipping by using an autonomous driving vehicle, which are applied to the technical field of moving a vehicle first to a vehicle loading dock and then to a loading location on a ship, and fixing the vehicle to the ship, so that a vehicle is automatically loaded onto a ship by autonomous driving of the vehicle based on the map of a loading dock and the ship, and destination information.

Technical Solution

According to an aspect of the disclosure, an automatic shipping apparatus includes a database configured to store traffic-related information about a road by mapping the traffic-related information to a map, a communication module configured to communicate with autonomous driving vehicles based on a wireless network, a vehicle transportation controller configured to calculate a first autonomous driving path for movement from a factory to an entrance of a vehicle loading dock, and transmit information about the first autonomous driving path to a car carrier vehicle, a vehicle standby controller configured to calculate a second autonomous driving path for movement from the entrance of the vehicle loading dock to a waiting area for shipment for each of a plurality of autonomous driving vehicles loaded on the car carrier vehicle, and transmit information about the second autonomous driving path to the autonomous driving vehicle, and a vehicle shipment controller configured to calculate a third autonomous driving path for movement from the waiting area for shipment into a ship according to whether the ship has entered a port, and transmit information about the third autonomous driving path to each of the plurality of autonomous driving vehicles.

According to another aspect of the disclosure, an automatic shipping method includes calculating a first autonomous driving path for movement from a factory to an entrance of a vehicle loading dock, enabling autonomous driving of a car carrier vehicle to the entrance of the vehicle loading dock by transmitting information about the first autonomous driving path to the car carrier vehicle, calculating a second autonomous driving path for movement from the entrance of the vehicle loading dock to a waiting area for shipment, for each of a plurality of autonomous driving vehicles loaded on the car carrier vehicle, enabling autonomous driving of each of the plurality of autonomous driving vehicles to the waiting area for shipment by transmitting information about the second autonomous driving path to the autonomous driving vehicle, calculating a third autonomous driving path for movement from the waiting area for shipment to the inside of a ship according to whether the ship has entered a port, and enabling autonomous driving of each of the plurality of autonomous driving vehicles to a shipment place inside the ship by transmitting information about the third autonomous driving path to the autonomous driving vehicle.

Advantageous Effects

The embodiment is applied to the technical field of moving a vehicle first to a vehicle loading dock and then to a loading location of a ship, and fixing the vehicle onto the ship, so that a vehicle is automatically loaded onto a ship by autonomous driving of the vehicle based on a map of a loading dock and the ship, and destination information.

BRIEF DESCRIPTION OF DRAWINGS

FIG. 6 is a diagram illustrating a method of automatic shipping by using an autonomous driving vehicle according to an embodiment of the disclosure.

DESCRIPTION OF REFERENCE NUMERALS

Figure 1:
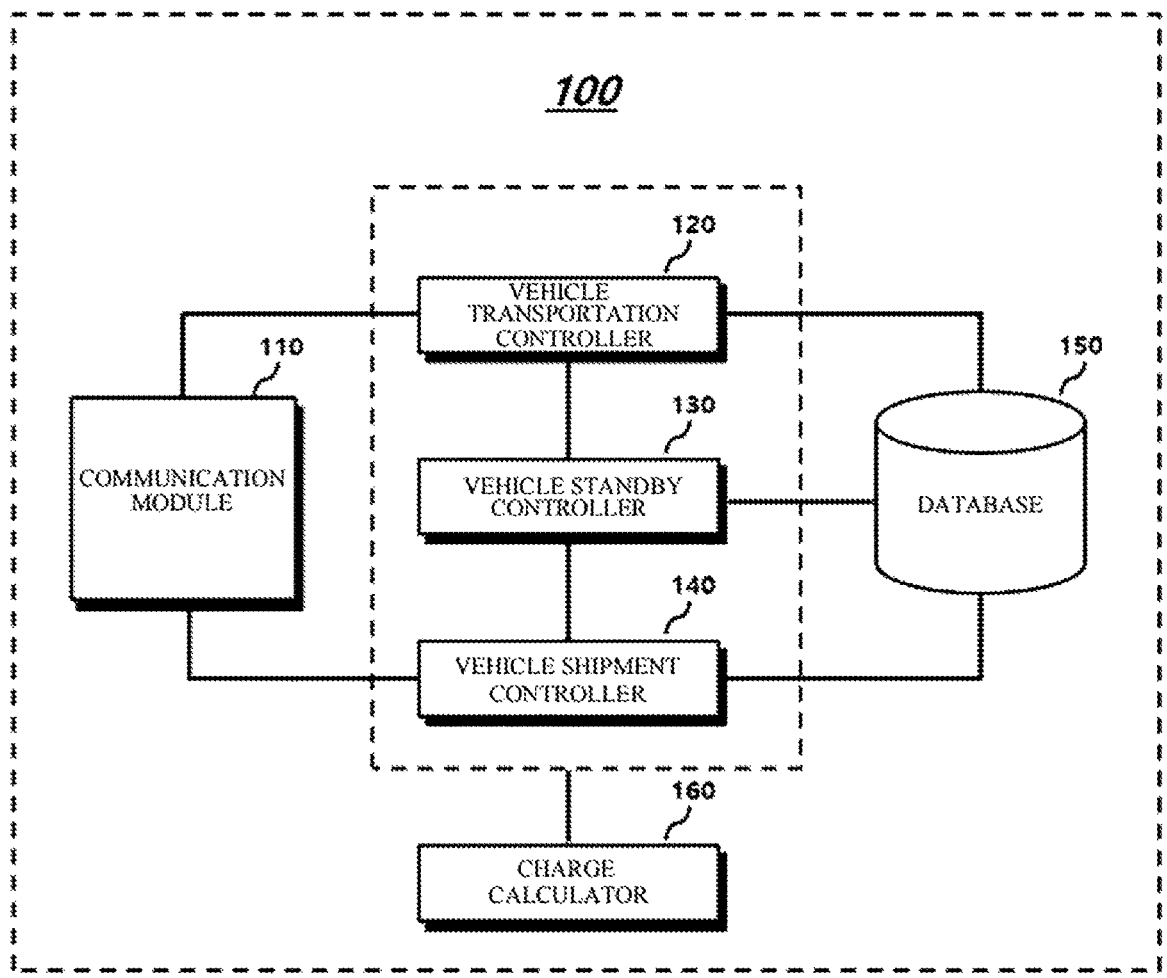
FIG. 1 is a block diagram illustrating an automatic shipping apparatus using an autonomous driving vehicle according to an embodiment of the disclosure.

100: automatic shipping apparatus
110: communication module
120: vehicle transportation controller
130: vehicle standby controller
140: vehicle shipment controller
150: database
210: factory
220: car carrier vehicle
230: autonomous driving vehicle
240: vehicle loading dock
250: vehicle

DETAILED DESCRIPTION OF EMBODIMENTS

With reference to the attached drawings, an embodiment of the disclosure will be described in detail.

FIG. 1 is a block diagram illustrating an automatic shipping apparatus using an autonomous driving vehicle according to an embodiment of the disclosure.

In general, to load a vehicle on a ship, human driving is involved in primary movement of the vehicle to a loading dock, secondary movement of the vehicle from the loading dock to a waiting place for shipment, and third movement of the vehicle from the waiting place for shipment to a loading location on a ship.

An automatic shipping apparatus 100 according to an embodiment of the disclosure is applied to the afore-described vehicle transportation and shipment field and automatically loads a vehicle on a ship based on a map of a loading dock and a ship and destination information through autonomous driving of the vehicle.

The automatic shipping apparatus 100 provides a total solution that encompasses providing of driving information for driving from a factory 210 to a ship 250 and destination locations at once in order to automatically load an autonomous driving vehicle 230 to the ship 250.

The automatic shipping apparatus 100 according to the embodiment provides a self-driving car implemented as an unmanned vehicle. A major field in which the automatic shipping apparatus 100 according to the embodiment may find its applications is preferably an automobile-only terminal operating system, which should not be construed as limiting the disclosure. The automatic shipping apparatus 100 refers to a system that provides a data service and collects data charges each time an autonomous driving vehicle is loaded as cargo into a terminal or a ship.

The automatic shipping apparatus 100 stores information about the internal layout of the ship 250 into a database. The automatic shipping apparatus 100 allocates each vehicle zone of a vehicle loading dock 240 and loads a vehicle from the vehicle zone to each ship 250.

When loading the autonomous driving vehicle 230 onto the ship 250, the automatic shipping apparatus 100 generates a loading location inside the ship 250 in real time based on an arrival time of the ship 250 at a port. That is, the automatic shipping apparatus 100 determines a loading location inside the ship 250 according to the destination of the autonomous driving vehicle 230 or the type of cargo.

The automatic shipping apparatus 100 according to the embodiment includes a communication module 110, a vehicle transportation controller 120, a vehicle standby controller 130, a vehicle shipment controller 140, a database 150, and a charge calculator 160. The automatic shipping apparatus 100 are not necessarily limited to the above components.

The components of the automatic shipping apparatus 100 may be connected to a communication path connecting software modules or hardware modules inside the apparatus 100 to organically operate with each other. These components communicate with each other by using one or more communication buses or signal lines.

Each component of the automatic shipping apparatus 100 illustrated in FIG. 1 is a unit for processing at least one function or operation, and may be implemented as a software module, a hardware module, or a combination of software and hardware.

The automatic shipping apparatus 100 includes a memory storing a program or protocol for communicating with a car carrier vehicle 220 and the autonomous driving vehicle 230 through a network, a microprocessor for executing the program and performing computation and control, and so on.

The communication module 110 is a communication means for executing a function of interworking with the car carrier vehicle 220 and the autonomous driving vehicle 230 through the network, and transmits and receives various data. The communication module 110 communicates with autonomous driving vehicles through a wireless network.

The automatic shipping apparatus 100 includes a microprocessor for executing a corresponding program to perform computations and control. The microprocessor is a functional module which may include the vehicle transportation controller 120, the vehicle standby controller 130, and the vehicle shipment controller 140.

The microprocessor is a control means that provides overall control to the functionalities of the automatic shipping apparatus 100, and controls the communication module 110 to communicate with the car carrier vehicle 220 and the autonomous driving vehicle 230.

The vehicle transportation controller 120 calculates a first autonomous driving path from the factory 210 to the entrance of the vehicle loading dock 240. The vehicle transportation controller 120 transmits information about the first autonomous driving path to the car carrier vehicle 220 through the network.

Upon receipt of a loading completion signal from the car carrier vehicle 220, the vehicle transportation controller 120 generates the first autonomous driving path by applying information about a road sign, the location of a traffic light, and the location of a building on a road from the factory 210 to the entrance of the vehicle loading dock 240.

The vehicle transportation controller 120 receives surroundings information obtained by sensing the surroundings and vehicle driving information based on driving from the car carrier vehicle 220, and determines whether the vehicle is driving based on the surroundings information and the vehicle driving information. Upon receipt of a lane change signal from the car carrier vehicle 220, the vehicle transportation controller 120 calculates a driving path and a speed for changing a lane by using the surroundings information and the vehicle driving information, and transmits information about the calculated driving path and speed to the car carrier vehicle 220.

The vehicle transportation controller 120 receives surroundings information including information about a road, the speed of a dynamic obstacle, a longitudinal acceleration, a lateral acceleration, and a location, which have been detected by at least one of a camera, a distance sensor, or a location sensor of the car carrier vehicle 220.

The vehicle transportation controller 120 receives vehicle driving information including information about the speed and location of the vehicle which have been detected by a speed sensor and the location sensor of the car carrier vehicle 220.

Upon detection of another vehicle driving in a driving lane, the vehicle transportation driver 120 controls the speed of the car carrier vehicle 220 so that the car carrier vehicle 220 is maintained at a predetermined safe distance from the other vehicle. When another vehicle is not detected, the vehicle transportation controller 120 controls the speed of the car carrier vehicle 220 to a safe speed.

The vehicle standby controller 130 calculates a second autonomous driving path in which each of a plurality of autonomous driving vehicles 230 loaded on the car carrier vehicle 220 is moved from the entrance of the vehicle loading dock 240 to the waiting area for shipment. The vehicle standby controller 130 transmits information about the second autonomous driving path for each autonomous driving vehicle 230 to the autonomous driving vehicle 230 through the network.

Upon receipt of a transportation completion signal from the car carrier vehicle 220 that has arrived at the entrance of the vehicle loading dock 240, the vehicle standby controller 130 generates second autonomous driving paths that allocate waiting areas of the vehicle loading dock 240, in which the plurality of autonomous driving vehicles loaded on the car carrier vehicle 220 are to get off, according to the size of the vehicle loading dock 240 and the number of the plurality of autonomous driving vehicles 230 loaded on the car carrier vehicle 220.

The vehicle standby controller 130 transmits information about a second autonomous driving path for each of the plurality of autonomous driving vehicles 230 loaded on the car carrier vehicle 220 to the autonomous driving vehicle 230 by applying information about a road, the location of a building, a waiting area, and a cargo handling area in the vehicle loading dock 240, to enable the autonomous driving vehicles 230 to move to the waiting areas for shipment, which are pre-allocated waiting areas of the vehicle loading dock 240.

The vehicle shipment controller 140 calculates a third autonomous driving path in which each of the plurality of the autonomous driving vehicles 230 moves from a waiting area for shipment to the inside of the ship 250 according to whether the ship 250 has arrived at the port. The vehicle shipment controller 140 transmits information about the third autonomous driving path to each of the plurality of autonomous driving vehicles 230 through the network.

Upon receipt of an arrival completion signal from the ship 250 entering the port, the vehicle shipment controller 140 selects a specific waiting area for shipment in which a vehicle to be loaded on the ship 250 is located among a plurality of waiting areas for shipment, and generates a third autonomous driving path which is a driving path from the specific waiting area for shipment to the inside of the ship 250.

The vehicle shipment controller 140 transmits information about the third autonomous driving path to each of a plurality of autonomous driving vehicles 230 located in the specific waiting area for shipment by applying information about a vehicle unloading order, the internal layout of the ship 250, and a storage area, to enable the autonomous driving vehicle 230 to move a pre-allocated shipment place.

The database 150 manages a general data structure implemented in a storage space (hard disk or memory) of a computer system by using a database management program (DBMS).

The database 150 may search (extract), delete, edit, and add data. The database 150 manages data by using a relational database management system (RDBMS). The database 150 has fields or elements to manage the data.

The database 150 stores traffic-related information on a road (a sign, the location of a traffic light, and the location of a building) by mapping the traffic-related information onto a map. The map stored in the database 150 is a map different from a general three-dimensional (3D) map, and has DNA information about the road (the sign, the location of the traffic light, and the location of the building). The database 150 includes a road database, a loading dock database, and a ship database.

The road database stores information about a road sign, the location of a traffic light, and the location of a building by mapping the information to a road map. The loading dock database stores information about a path and the location of a building inside the loading dock by mapping the information to a loading dock map. The ship database stores information about the internal layout and the storage area of the ship 250 by mapping the information to a ship inside map.

The charge calculator 160 settles a charge for data transmitted to the autonomous driving vehicles 230 and the car carrier vehicle 220.

Figure 2:
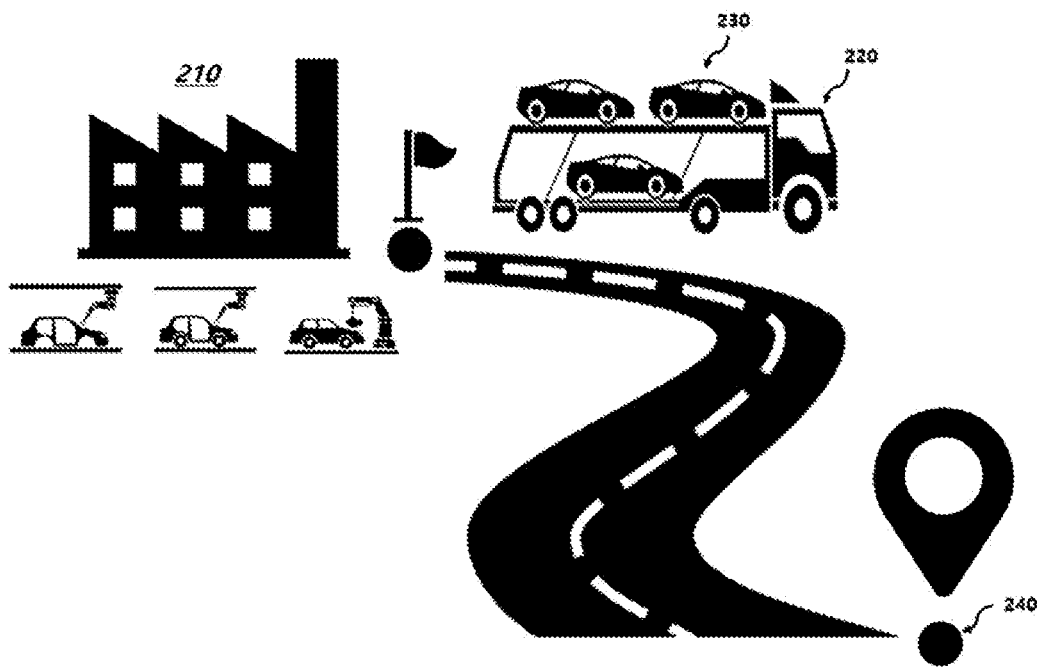
FIG. 2 is a diagram illustrating a method of moving from a factory to an entrance of a vehicle loading dock by autonomous driving according to an embodiment of the disclosure.

FIG. 2 is a diagram illustrating a method of moving from the factory to the entrance of the vehicle loading dock 240 by autonomous driving according to the embodiment.

The car carrier vehicle 220 is a self-driving capable vehicle which transports a plurality of autonomous driving vehicles 230 loaded from the factory 210. The autonomous driving vehicles 230 loaded on the car carrier vehicle 220 also refer to vehicles capable of self-driving.

The automatic shipping apparatus 100 provides data required for autonomous driving to the autonomous driving vehicles 230 and the car carrier vehicle 220 based on a network technology. The autonomous driving vehicles 230 and the car carrier vehicle 220 autonomously drive based on the data received from the automatic shipping apparatus 100 based on the network.

The automatic shipping apparatus 100 extracts information to appear during driving of the autonomous driving vehicles 230 and the car carrier vehicle 220 from the DNA information pre-stored in the database 150, and transmits data enabling autonomous driving to the autonomous driving vehicles 230 and the car carrier vehicle 220 through the network.

The car carrier vehicle 220 determines its location, traveling speed, and direction based on the data received from the automatic shipping apparatus 100 through the network. The car carrier vehicle 220 calculates a distance to a preceding vehicle by using a lidar provided in the car carrier vehicle 220, and communicates with a vehicle on a side of the car carrier vehicle 220.

The automatic shipping apparatus 100 collects data about roads, the port, and the ship so that the autonomous driving vehicles 230 may be loaded onto the ship by full autonomous driving. Information about a road, the inside of the loading dock, and the inside of the ship stored in the database 150 by the automatic shipping apparatus 100 is converted into a database structure based on information collected by a vehicle with a sensor attached thereto or a collection device.

The car carrier vehicle 220 is loaded with the autonomous driving vehicles 230 at the factory 210. When the loading of the autonomous driving vehicles 230 is completed, the car carrier vehicle 220 transmits a loading completion signal to the automatic shipping apparatus 100 through the network.

The automatic shipping apparatus 100 calculates the first autonomous driving path in which the car carrier vehicle 220 moves from the factory 210 to the entrance of the vehicle loading dock 240. The automatic shipping apparatus 100 transmits information about the first autonomous driving path to the car carrier vehicle 220 through the network.

Upon receipt of the a loading completion signal from the car carrier vehicle 220, the automatic shipping apparatus 100 generates the first autonomous driving path reflecting information about a road sign, the location of a signal light, and the location of a building between the factory 210 in which the car carrier vehicle 220 is located to the entrance of the vehicle loading dock 240.

The car carrier vehicle 220 receives the first autonomous driving path corresponding to the a loading completion signal from the automatic shipping apparatus 100 through the network. The car carrier vehicle 220 transports the cargo in the first autonomous driving path from the factory 210 to the entrance of the vehicle loading dock 240 by autonomous driving.

The automatic shipping apparatus 100 receives surroundings information sensed from the surroundings and vehicle driving information based on driving from the car carrier vehicle 220. The automatic shipping apparatus 100 determines whether the car carrier vehicle 220 is moving based on the surroundings information and the vehicle driving information. Upon receipt of a lane change signal from the car carrier vehicle 220, the automatic shipping apparatus 100 calculates a driving path and a speed for a lane change based on the surroundings information and the vehicle driving information and transmits information about the driving path and the speed to the car carrier vehicle 220.

The automatic shipping apparatus 100 receives the surroundings information including information about a road, the speed of a dynamic obstacle, a longitudinal acceleration, a lateral acceleration, and a location, which have been detected by at least one of the camera, the distance sensor, and the location sensor of the car carrier vehicle 220.

The automatic shipping apparatus 100 receives the vehicle driving information including information about the speed and location of the vehicle which have been detected by the speed sensor and the location sensor of the car carrier vehicle 220.

Upon detection of another vehicle driving in a driving lane, the automatic shipping apparatus 100 controls the speed of the car carrier vehicle 220 so that the other vehicle is maintained at a predetermined safe distance. When another vehicle is not detected, the automatic shipping apparatus 100 controls the speed of the car carrier vehicle 220 to a safe speed.

Figure 3:
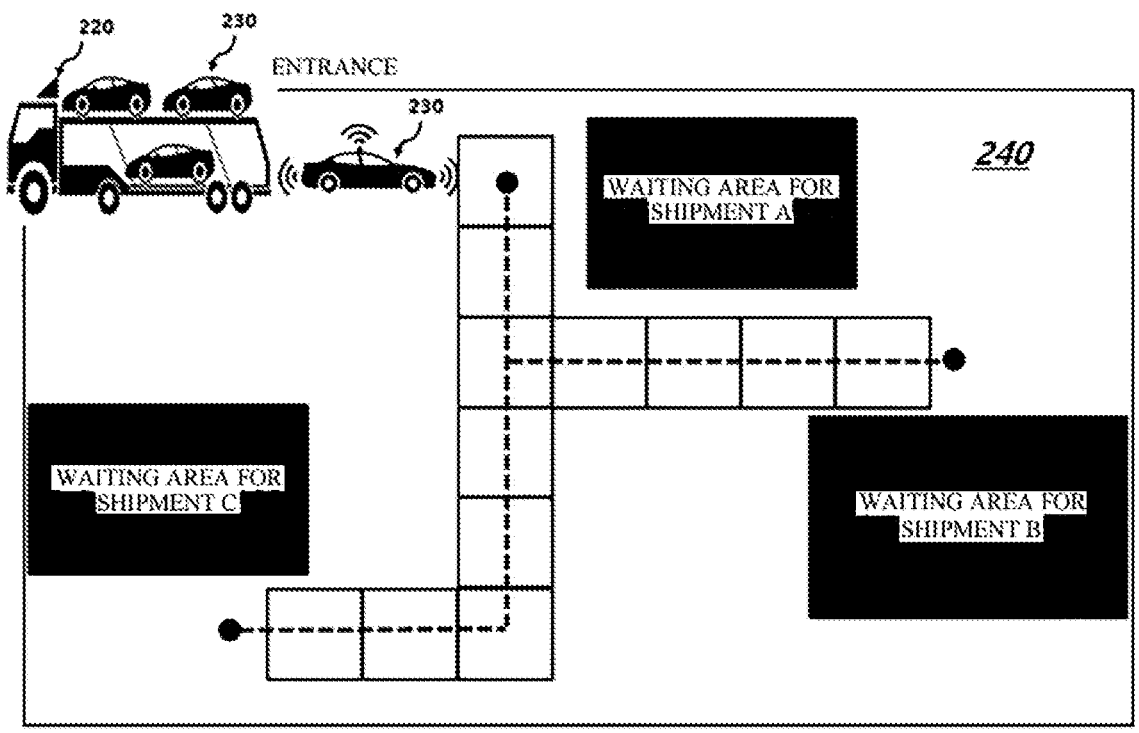
FIG. 3 is a diagram illustrating a method of moving from the entrance of the vehicle loading dock to a waiting area for shipment by autonomous driving according to an embodiment of the disclosure.

FIG. 3 is a diagram illustrating a method of moving from the entrance of the vehicle loading dock to the waiting area for shipment by autonomous driving according to the embodiment.

As illustrated in FIG. 3, when the autonomous driving vehicles 230 loaded on the car carrier vehicle 220 arrive as cargo, the automatic shipping apparatus 100 determines an area in which the arrived cargo will be unloaded. The automatic shipping apparatus 100 determines a zone of the vehicle loading dock 240 or the port, in which the autonomous driving vehicles 230 will be unloaded from the car carrier vehicle 220.

After arriving at the entrance of the vehicle loading dock 240, the car carrier vehicle 220 transmits a transportation completion signal to the automatic shipping apparatus 100 through the network. In other words, when the car carrier vehicle 220 arrives at the vehicle loading dock 240, the car carrier vehicle 220 transmits the transportation completion signal and information about a parking location to the automatic shipping apparatus 100 through the network. The automatic shipping apparatus 100 receives the transportation completion signal from the car carrier vehicle 220 that has arrived at the entrance of the vehicle loading dock 240.

After parking at a predetermined cargo handling area at the entrance of the vehicle loading dock 240, the car carrier vehicle 220 automatically opens a cargo fixing device to automatically unload a plurality of autonomous driving vehicles 230 from the car carrier vehicle 220.

Upon receipt of a parking completion signal and the information about the parking location from the car carrier vehicle 220, the automatic shipping apparatus 100 determines a place in which the cargo will get off and wait (a waiting area for shipment) in the vehicle loading dock 240.

For each of the plurality of autonomous driving vehicles 230 loaded on the car carrier vehicle 220, the automatic shipping apparatus 100 calculates a second autonomous driving path in which the autonomous driving vehicle 230 is to move from the entrance of the vehicle loading dock 240 to a waiting area for shipment (e.g., one of waiting area for shipment A, waiting area for shipment B, and waiting area for shipment C).

For each of the plurality of autonomous driving vehicles 230 loaded on the car carrier vehicle 220, the automatic shipping apparatus 100 calculates the second autonomous driving path in which the autonomous driving vehicle 230 is to move from the entrance of the vehicle loading dock 240 to a waiting area for shipment (e.g., one of waiting area for shipment A, waiting area for shipment B, and waiting area for shipment C). Then, the automatic shipping apparatus 100 transmits information about the second autonomous driving path for each of the plurality of autonomous driving vehicles 230 to the autonomous driving vehicle 230.

The automatic shipping apparatus 100 generates second autonomous driving paths with waiting areas of the vehicle loading dock 240 allocated thereto, in which the plurality of autonomous driving vehicles 230 loaded on the car carrier vehicle 220 are to get off, according to the size of the vehicle loading dock 240 and the number of the plurality of autonomous driving vehicles 230 loaded on the car carrier vehicle 220.

The automatic shipping apparatus 100 transmits information about a place in which each of the plurality of autonomous driving vehicles 230 loaded on the car carrier vehicle 220 is to get off and wait (a waiting area for shipment) to the autonomous driving vehicle 230. The automatic shipping apparatus 100 transmits information about the second autonomous driving path to each of the plurality of autonomous driving vehicles 230 through the network.

The automatic shipping apparatus 100 transmits information about the second autonomous driving path reflecting information about a road, the location of a building, a waiting area, and a cargo handling area in the vehicle loading dock 240 to each of the plurality of autonomous driving vehicles 230, to enable the autonomous driving vehicle 230 to move to the waiting area for shipment, which is a pre-allocated waiting area of the vehicle loading dock 240.

Each of the plurality of autonomous driving vehicles 230 autonomously moves to the waiting area for shipment (e.g., one of waiting area for shipment A, waiting area for shipment B, and waiting area for shipment C) inside the vehicle loading dock 240 based on the data received from the automatic shipping apparatus 100 through the network. In other words, the autonomous driving vehicle 230 moves from the entrance of the vehicle loading dock 240 to the waiting area for shipment inside the vehicle loading dock 240.

Each of the plurality of autonomous driving vehicles 230 autonomously moves to the waiting place (the waiting area for shipment) based on the data received from the automatic shipping apparatus 100 and then parks.

Each of the autonomous driving vehicles 230 determines its location, traveling speed, and direction based on the data received from the automatic shipping apparatus 100 through the network. The autonomous driving vehicle 230 calculates a distance to a preceding vehicle by using a lidar of the autonomous driving vehicle 230, and communicates with a vehicle on a side of the autonomous driving vehicle 230.

Figure 4:
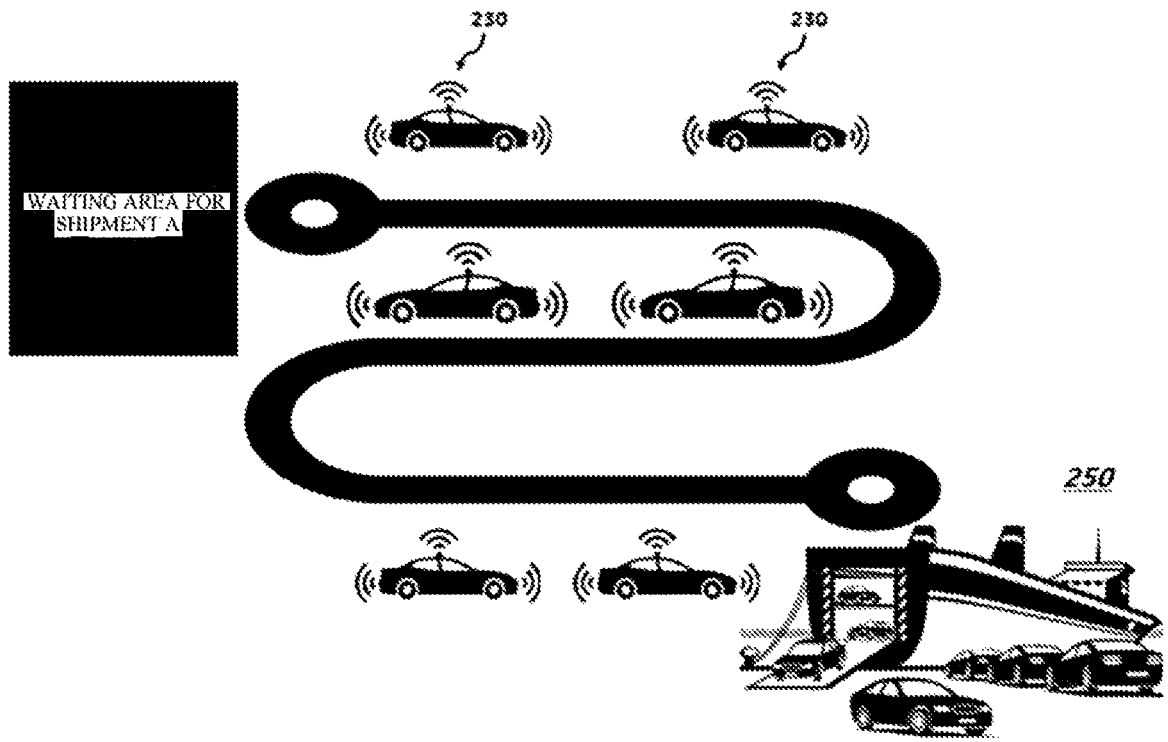
FIG. 4 is a diagram illustrating a method of moving from the waiting area for shipment into a ship according to an embodiment of the disclosure.

FIG. 4 is a diagram a method of moving from the waiting area for shipment to the inside of the ship according to the embodiment.

When the ship 250 enters the port, the ship 250 transmits a port arrival signal to the automatic shipping apparatus 100 through the network. The automatic shipping apparatus 100 receives a port arrival completion signal from the ship 250 entering the port.

Upon receipt of the port arrival signal, the automatic shipping apparatus 100 determines a loading area inside the ship 250 in response to the port arrival signal. When the ship 250 arrives at the vehicle loading dock 240 or the port, the automatic shipping apparatus 100 determines a zone of the ship 250 in which to load the autonomous driving vehicles 230.

The automatic shipping apparatus 100 generates a third autonomous driving path, which is a driving path from a specific waiting area for shipment to the inside of the ship 250. The automatic shipping apparatus 100 selects a specific waiting area for shipment in which a vehicle to be loaded onto the ship 250 is located from among a plurality of waiting areas for shipment.

The automatic shipping apparatus 100 calculates the third autonomous driving path in which the autonomous driving vehicle 230 is to move from the waiting area for shipment to the inside of the ship 250 according to whether the ship 250 has entered the port. The automatic shipping apparatus 100 transmits information about a third autonomous driving path for each of the autonomous driving vehicles 230 to the autonomous driving vehicle 230 through the network.

The automatic shipping apparatus 100 transmits data that enables each of a plurality of autonomous driving vehicles 230 parked in the waiting area for shipment to be loaded at a specific location inside the ship 250 to the autonomous driving vehicle 230. The automatic shipping apparatus 100 transmits, to each of the plurality of autonomous driving vehicles 230 located in the specific waiting area for shipment, information about the third autonomous driving path for the autonomous driving vehicle 230 by applying a vehicle unloading order, information about the internal layout of the ship 250, and information about the storage area of the ship 250, to enable the autonomous driving vehicle 230 to move to the loading place which is a pre-allocated area of the ship 250.

As illustrated in FIG. 4, when each of the plurality of autonomous driving vehicles 230 receives data from the automatic shipping apparatus 100 while waiting in the waiting area for shipment, the autonomous driving vehicle 230 autonomously moves to the inside of the specific ship 250 based on the data. That is, the automatic shipping apparatus 100 continuously provides the autonomous driving vehicle 230 with information about each destination of the cargo in the transportation process.

Each of the plurality of autonomous driving vehicles 230 is autonomously loaded to the corresponding location inside the ship 250. Then, when the ship 250 moves to a destination, each of the plurality of autonomous driving vehicles 230 loaded on the ship 250 is unloaded to a destination location based on data received from the automatic shipping apparatus 100.

Figure 5:
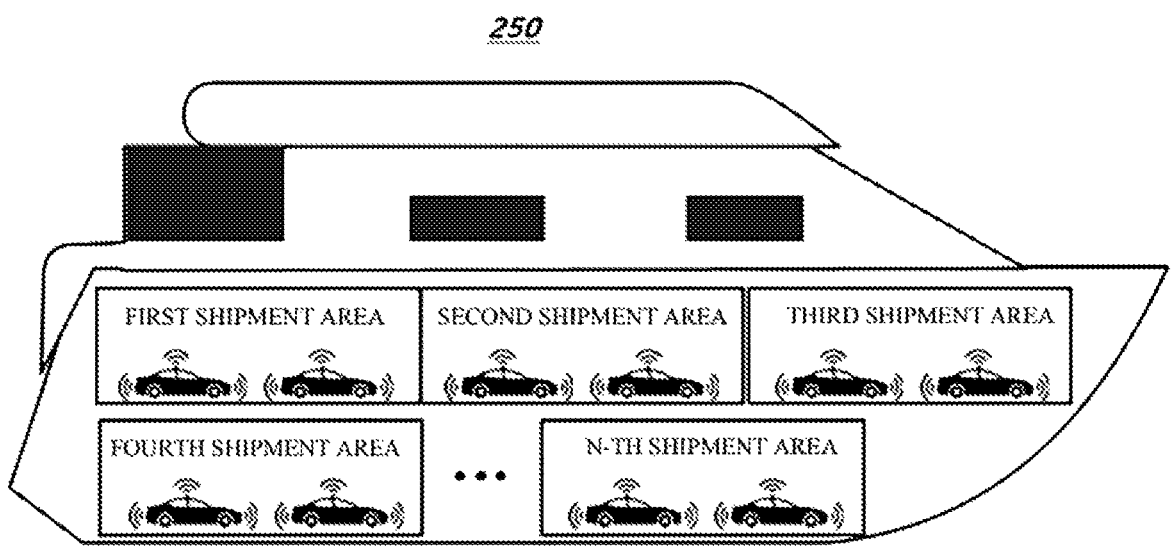
FIG. 5 is a diagram illustrating a storage area inside the ship according to an embodiment of the disclosure.

FIG. 5 is a diagram illustrating the storage area of the ship according to the embodiment.

As illustrated in FIG. 5, the automatic shipping apparatus 100 includes a ship database that stores information about the internal layout and storage area of the ship 250 by mapping the information to a map of the inside of the ship 250.

The automatic shipping apparatus 100 determines a shipping location that leads to shipment of as many autonomous driving vehicles 230 as possible by optimizing shipping locations inside the ship 250. The automatic shipping apparatus 100 transmits data of the determined loading location inside the ship 250 to each autonomous driving vehicle 230.

FIG. 6 is a flowchart illustrating an automatic shipping method using an autonomous driving vehicle according to the embodiment.

The automatic shipping apparatus 100 calculates a first autonomous driving path in which an autonomous driving vehicle is to move from the factory 210 to the entrance of the vehicle loading dock 240 (S610). In step S610, upon receipt of a loading completion signal from the car carrier vehicle 220, the automatic shipping apparatus 100 generates a first autonomous driving path reflecting information about a sign, the location of a signal light, and the location of a building on a road from the factory 210 in which the car carrier vehicle 220 is located to the entrance of the vehicle loading dock 240.

The automatic shipping apparatus 100 receives surroundings information sensed from the surroundings and vehicle driving information based on driving from the car carrier vehicle 220, and determines whether the vehicle is moving based on the surroundings information and the vehicle driving information.

Upon receipt of a lane change signal from the car carrier vehicle 220, the automatic shipping apparatus 100 calculates a driving path and a speed for a lane change based on the surroundings information and the vehicle driving information.

The automatic shipping apparatus 100 receives surroundings information including information about a road around the vehicle, the speed of a dynamic obstacle, a longitudinal acceleration, a lateral acceleration, and a location, which have been detected by at least one of the camera, the distance sensor, and the location sensor provided in the car carrier vehicle 220.

The automatic shipping apparatus 100 receives vehicle driving information including information about the speed and location of the vehicle, which have been detected by the speed sensor and the location sensor of the car carrier vehicle 220.

Upon detection of another vehicle traveling in a driving lane, the automatic shipping apparatus 100 controls the speed of the car carrier vehicle 220 so that the other vehicle is maintained at a predetermined safe distance.

When another vehicle is not detected, the automatic shipping apparatus 100 controls the speed of the car carrier vehicle 220 to a safe speed.

The automatic shipping apparatus 100 transmits information about the first autonomous driving path to the car carrier vehicle 220 through a network (S620). After step S620, the automatic shipping apparatus 100 calculates a charge for the data transmitted to the car carrier vehicle 220.

The automatic shipping apparatus 100 calculates a second autonomous driving path for each of a plurality of autonomous driving vehicles 230 loaded on the car carrier vehicle 220, so that the autonomous driving vehicle 230 moves from the entrance of the vehicle loading dock 240 to a waiting area for shipment in the second autonomous driving path (S630).

In step S630, the automatic shipping apparatus 100 receives a transportation completion signal from the car carrier vehicle 220 arriving at the entrance of the vehicle loading dock 240. Then, the automatic shipping apparatus 100 generates a second autonomous driving path to which a waiting area of the vehicle loading dock 240 for unloading each of the plurality of vehicles from the car carrier vehicle 220 is allocated, based on the size of the vehicle loading dock 240 and the number of the plurality of autonomous driving vehicles 230 loaded on the car carrier vehicle 220.

The automatic shipping apparatus 100 transmits, to each of the plurality of autonomous driving vehicles 230, information about the second autonomous driving path for the autonomous driving vehicle through the network (S640). After step S640, the automatic shipping apparatus 100 calculates a charge for the data transmitted to the autonomous driving vehicles 230.

In step S640, the automatic shipping apparatus 100 transmits, to each of the plurality of autonomous driving vehicles 230, information about a second autonomous driving path reflecting information about a road, the location of a building, the waiting area, and a cargo handling area inside the vehicle loading dock 240, so that the autonomous driving vehicle may move to the waiting area for shipment, which is a pre-allocated waiting area of the vehicle loading dock 240.

The automatic shipping apparatus 100 calculates a third autonomous driving path for movement from the waiting area for shipment to the inside of the ship 250 according to whether the ship 250 enters the port (S650).

In step S650, the automatic shipping apparatus 100 receives a port arrival completion signal from the ship 250 entering the port. Then, the automatic shipping apparatus 100 selects a specific waiting area for shipment, in which a vehicle to be loaded on the ship 250 is located among a plurality of waiting areas for shipment, and generates a third autonomous driving path which is a driving path from the specific waiting area for shipment to the inside of the ship 250.

The automatic shipping apparatus 100 transmits, to each of the plurality of autonomous driving vehicles 230, information about the third autonomous driving path for the autonomous driving vehicle 230 through the network (S660). After step S660, the automatic shipping apparatus 100 calculates a charge for the data transmitted to the car carrier vehicle 220.

In step S660, the automatic shipping apparatus 100 transmits, to each of a plurality of autonomous driving vehicles 230 located in the specific waiting area for shipment, information about the third autonomous driving path for movement of the autonomous driving vehicle 230 to a loading place being a pre-allocated area of the ship 250 by applying a vehicle unloading order, information about the internal layout of the ship 250, and information about the storage area of the ship 250.

While it has been described with reference to FIG. 6 that steps S610 to S660 are sequentially performed, the disclosure is not limited thereto. In other words, since the steps of FIG. 6 may be performed in a changed order or one or more steps may be performed in parallel, the steps of FIG. 6 are not necessarily performed in a time-series order.

As described above, the automatic shipping method using an autonomous driving vehicle according to the embodiment described in FIG. 6 may be implemented as a program and recorded in a computer-readable recording medium. The computer-readable recording medium recording the program for implementing the automatic shipping method using an autonomous driving vehicle according to the embodiment includes all kinds of recording devices in which data readable by a computer system is stored.

Those skilled in the art will appreciate that the disclosure may be carried out in other specific ways than those set forth herein without departing from the spirit and essential characteristics of the disclosure. The above embodiment is therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. An automatic shipping apparatus comprising:
   a database configured to store traffic-related information about a road by mapping the traffic-related information to a map;
   a communication module configured to communicate with autonomous driving vehicles based on a wireless network; and
   a microprocessor operably connected to the communication module and configured to control the communication module to communicate with a car carrier vehicle and an autonomous driving vehicle, wherein microprocessor comprises:
   a vehicle transportation controller operably connected to the communication module and configured to receive a loading completion signal from the car carrier vehicle through the wireless network and calculate, upon receiving the loading completion signal, a first autonomous driving path for movement from a factory to an entrance of a vehicle loading dock, and transmit information about the first autonomous driving path to the car carrier vehicle;
   a vehicle standby controller operably connected to the communication module and configured to receive a transportation completion signal from the car carrier vehicle through the wireless network and calculate, upon receiving the transportation completion signal, a second autonomous driving path for movement from the entrance of the vehicle loading dock to a waiting area for shipment for each of a plurality of autonomous driving vehicles loaded on the car carrier vehicle, and transmit information about the second autonomous driving path to the autonomous driving vehicle; and a vehicle shipment controller operably connected to the communication module and configured to receive a port arrival completion signal from a ship through the wireless network and calculate, upon receiving the port arrival completion signal, a third autonomous driving path for movement from the waiting area for shipment into the ship according to whether the ship has entered a port, and transmit information about the third autonomous driving path to each of the plurality of autonomous driving vehicles, and wherein upon detection of another vehicle traveling in a driving lane, the vehicle transportation controller is configured to control a speed of the car carrier vehicle to maintain a predetermined safe distance to the other vehicle, and when another vehicle is not detected in the driving lane, the vehicle transportation controller is configured to control the speed of the car carrier vehicle to a safe speed.

2. The automatic shipping apparatus of claim 1, wherein upon receipt of the loading completion signal from the car carrier vehicle, the vehicle transportation controller is configured to generate the first autonomous driving path by applying information about a sign, a location of a signal light, and a location of a building between the factory in which the car carrier vehicle is located and the entrance of the vehicle loading dock.

3. An automatic shipping apparatus comprising:
a database configured to store traffic-related information about a road by mapping the traffic-related information to a map;
a communication module configured to communicate with autonomous driving vehicles based on a wireless network; and
a microprocessor operably connected to the communication module and configured to control the communication module to communicate with a car carrier vehicle and an autonomous driving vehicle, wherein microprocessor comprises:
a vehicle transportation controller operably connected to the communication module and configured to receive a loading completion signal from the car carrier vehicle through the wireless network and calculate, upon receiving the loading completion signal, a first autonomous driving path for movement from a factory to an entrance of a vehicle loading dock, and transmit information about the first autonomous driving path to the car carrier vehicle;
a vehicle standby controller operably connected to the communication module and configured to receive a transportation completion signal from the car carrier vehicle through the wireless network and calculate, upon receiving the transportation completion signal, a second autonomous driving path for movement from the entrance of the vehicle loading dock to a waiting area for shipment for each of a plurality of autonomous driving vehicles loaded on the car carrier vehicle, and transmit information about the second autonomous driving path to the autonomous driving vehicle; and a vehicle shipment controller operably connected to the communication module and configured to receive a port arrival completion signal from a ship through the wireless network and calculate, upon receiving the port arrival completion signal, a third autonomous driving path for movement from the waiting area for shipment into the ship according to whether the ship has entered a port, and transmit information about the third autonomous driving path to each of the plurality of autonomous driving vehicles, wherein the vehicle transportation controller is configured to receive surroundings information sensed from at least one of a camera, a distance sensor or a location sensor provided in the car carrier vehicle and vehicle driving information based on driving from the car carrier vehicle and determine whether the car carrier vehicle is moving based on the surroundings information and the vehicle driving information, and to, upon receipt of a lane change signal from the car carrier vehicle, calculate a driving path and a speed for a lane change by using the surroundings information and the vehicle driving information and transmit information about the driving path and the speed to the car carrier vehicle, and wherein upon detection of another vehicle traveling in a driving lane, the vehicle transportation controller is configured to control a speed of the car carrier vehicle to maintain a predetermined safe distance to the other vehicle, and when another vehicle is not detected in the driving lane, the vehicle transportation controller is configured to control the speed of the car carrier vehicle to a safe speed.

4. The automatic shipping apparatus of claim 3, wherein the vehicle transportation controller is configured to receive the surroundings information including information about a road around the vehicle, the speed of a dynamic obstacle, a longitudinal acceleration, a latitudinal acceleration, and a location detected by at least one of a camera, a distance sensor, or a location sensor provided in the car carrier vehicle.

5. The automatic shipping apparatus of claim 3, wherein the vehicle transportation controller is configured to receive the vehicle driving information including information about a speed and a location of the vehicle detected by a speed sensor and a location sensor provided in the car carrier vehicle.

6. The automatic shipping apparatus of claim 1, wherein upon receipt of the transportation completion signal from the car carrier vehicle which has arrived at the entrance of the vehicle loading dock, the vehicle standby controller is configured to generate the second autonomous driving path with a waiting area of the vehicle loading dock in which the plurality of autonomous driving vehicles loaded on the car carrier vehicle are to get off allocated thereto based on a size of the vehicle loading dock and a number of the plurality of autonomous driving vehicles loaded on the car carrier vehicle.

7. The automatic shipping apparatus of claim 6, wherein the vehicle standby controller is configured to transmit, to each of the plurality of autonomous driving vehicles loaded on the car carrier vehicle, the information about the second autonomous driving path for movement from a waiting area for shipment being a pre-allocated waiting area of the vehicle loading dock by applying information about a road, a location of a building, a waiting area, and a cargo handling area inside the vehicle loading dock.

8. The automatic shipping apparatus of claim 1, wherein upon receipt of the port arrival completion signal from the ship which has entered the port, the vehicle shipment controller is configured to select a specific waiting area for shipment in which a vehicle to be loaded on the ship is located, and generate the third autonomous driving path being a driving path from the specific waiting area for shipment to an inside of the ship.

9. The automatic shipping apparatus of claim 8, wherein the vehicle shipment controller is configured to transmit, to each of a plurality of autonomous driving vehicles located in the specific waiting area for shipment, the information about the third autonomous driving path for movement to a shipment place being a pre-allocated area inside the ship by applying information about a vehicle unloading order, an internal layout of the ship, and a storage area inside the ship.

10. The automatic shipping apparatus of claim 1, wherein the database comprises:
- a road database configured to store information about a sign, a location of a signal light, and a location of a building on a road by mapping the information to a road map;
- a loading dock database configured to store information about a path and a location of a building inside the vehicle loading dock by mapping the information to a vehicle loading dock map; and
- a ship database configured to store information about an internal layout of the ship and a storage area of the ship by mapping the information to a ship inside map.

11. The automatic shipping apparatus of claim 1, further comprising a charge calculator configured to calculate a charge for data transmitted to the autonomous driving vehicles and the car carrier vehicle.

12. An automatic shipping method performed by a processor of an automatic apparatus, the method comprising:
- calculating a first autonomous driving path for movement from a factory to an entrance of a vehicle loading dock upon receiving a loading completion signal from a car carrier vehicle through a wireless network;
- enabling autonomous driving of a car carrier vehicle to the entrance of the vehicle loading dock by transmitting information about the first autonomous driving path to a car carrier vehicle;
- controlling a speed of the car carrier vehicle to maintain a predetermined safe distance to the other vehicle, upon detection of another vehicle traveling in a driving lane;
- controlling the speed of the car carrier vehicle to a safe speed when another vehicle is not detected in the driving lane;
- calculating a second autonomous driving path for movement from the entrance of the vehicle loading dock to a waiting area for shipment, for each of a plurality of autonomous driving vehicles loaded on the car carrier vehicle upon receiving a transportation completion signal from the car carrier vehicle through the wireless network;
- enabling autonomous driving of each of the plurality of autonomous driving vehicles to the waiting area for shipment by transmitting information about the second autonomous driving path to the autonomous driving vehicle;
- calculating a third autonomous driving path for movement from the waiting area for shipment to an inside of a ship according to whether the ship has entered a port upon receiving a port arrival completion signal from the ship through the wireless network; and
- enabling autonomous driving of each of the plurality of autonomous driving vehicles to a shipment place inside the ship by transmitting information about the third autonomous driving path to the autonomous driving vehicle.

* * * * *